United States Patent
Yatziv

(10) Patent No.: US 6,862,648 B2
(45) Date of Patent: Mar. 1, 2005

(54) INTERFACE EMULATION FOR STORAGE DEVICES

(75) Inventor: Michael Yatziv, Saratoga, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 476 days.

(21) Appl. No.: 10/002,782

(22) Filed: Oct. 29, 2001

(65) Prior Publication Data

US 2002/0062387 A1 May 23, 2002

Related U.S. Application Data

(60) Provisional application No. 60/244,463, filed on Oct. 30, 2000.

(51) Int. Cl.[7] .......................... G06F 13/36; G06F 13/14
(52) U.S. Cl. ...................... 710/315; 710/305; 710/314
(58) Field of Search ............................. 710/315, 314, 710/305; 709/230, 211

(56) References Cited

U.S. PATENT DOCUMENTS

| | | | |
|---|---|---|---|
| 5,664,144 A | 9/1997 | Yanai et al. | |
| 5,848,251 A | * 12/1998 | Lomelino et al. | ........... 710/305 |
| 5,867,648 A | * 2/1999 | Foth et al. | .................. 709/230 |
| 5,922,062 A | 7/1999 | Evoy | |
| 6,006,295 A | 12/1999 | Jones et al. | |
| 6,041,381 A | * 3/2000 | Hoese | ........................ 710/315 |
| 6,209,023 B1 | * 3/2001 | Dimitroff et al. | ........... 709/211 |

* cited by examiner

Primary Examiner—Tim Vo
(74) Attorney, Agent, or Firm—Meyertons Hood Kivlin Kowert & Goetzel, PC; B. Noël Kivlin

(57) ABSTRACT

An interface adapter is provided that allows a host device that communicates through a first interface protocol, such as a Fiber Channel compliant interface or a SCSI compliant interface, to connect to a plurality of storage devices that communicate through a second interface protocol, such as an IDE/ATA compliant interface. The interface adapter is configured to convert transmissions received from the host device to the second interface protocol and to convey the converted transmissions to the plurality of storage devices. The interface adapter is also configured to convert transmissions received according to the second interface protocol from the plurality of storage devices to the first interface protocol and to convey the converted transmissions to the host device. In this manner, the host device and the storage devices can accomplish input/output (I/O) transactions despite the fact that they implement different interface protocols. The interface adapter may allow IDE/ATA storage devices to be used in storage systems connected to host computer systems that communicate through a Fiber Channel compliant interface.

30 Claims, 7 Drawing Sheets

INTERFACE EMULATION FOR STORAGE DEVICES

This application claims the benefit of Provisional Application Ser. No 60/244,463, filed Oct. 30, 2000.

BACKGROUND OF THE INVENTION

Devices in computer systems can perform varying functions. For example, devices such as microprocessors can execute instructions while devices such as disk drives can store instructions and data. In order for such devices to communicate, they each need to conform to an interface protocol. Interface protocols typically specify a means for multiple devices to communicate. The means for communicating, however, can vary widely between different interface protocols.

A traditional interface protocol that is used by devices such as hard disk drives and CD-ROM drives is often referred to as the IDE ("Intelligent Disk Electronics"), ATA ("Advanced Technology Attachment"), or IDE/ATA interface protocol. The IDE/ATA interface protocol is defined by a set of standards adopted by the American National Standards Institute, Inc. These standards include "Information Systems—AT Attachment Interface for Disk Drives" (ANSI X3.221-1994), "Information Technology—AT Attachment Interface with Extensions (ATA-2)" (ANSI X3.279-1996), "Information Technology—AT Attachment-3 Interface (ATA-3)" (ANSI X3.298-1997), and "AT Attachment with Packet Interface Extension (ATA/ATAPI-4)" (ANSI NCITS 317-1998). There are numerous variations of the IDE/ATA interface protocol, such as ATA/ATAPI, EIDE, ATA-2, and Ultra ATA. The current standards that define the various IDE/ATA interface protocols will be collectively referred to herein as the IDE/ATA protocol or IDE/ATA interface, and hard disk drives configured to operate using the IDE/ATA interface will be referred to as IDE/ATA drives. The standards may be obtained from ANSI, 11 West $42^{nd}$ St., New York, N.Y. 10036 or http://www.ansi.org.

Another interface protocol often used with storage subsystems is the Small Computer System Interface ("SCSI"). As with the IDE/ATA interface, there are numerous variations of the SCSI interface, such as SCSI-1, Wide SCSI, Fast SCSI, Ultra SCSI, etc. As used herein, the terms "SCSI interface" or "SCSI interface protocol" are intended to refer to any of the variations of the SCSI interface. The SCSI interface has been used, for example, by host computers for I/O communications with storage subsystems. These host computers communicate with the storage subsystem using SCSI commands, and the storage subsystems transmit these SCSI commands to SCSI-compliant hard disk drives.

Fibre Channel ("FC") is an industry-standard, high-speed serial data transfer interface that can be used to connect systems and storage in point-to-point or switched topologies. Many varying types of devices can be connected using the FC protocol over large distances. These devices include servers, workstations, storage devices, hubs, and switches. The FC protocol is defined by a set of standards adopted by the American National Standards Institute, Inc. (ANSI). These standards include "Information Technology—Fibre Channel—Physical and Signaling Interface (FC-PH)" (ANSI X3.230-1994), "Information Technology—Fibre Channel Physical and Signaling Interface (FC-PH)—Amendment 1" (ANSI X3.230-1994/AM 1-1996), "Information Technology—Fibre Channel—Physical and Signalling Interface-2 (FC-PH-2)" (ANSI X3.297-1997), and "Fibre Channel Physical and Signalling Interface-3 (FC-PH-3)" (ANSI X3.303-1998). The standards that define the FC protocol will be referred to collectively as the Fibre Channel or FC protocol. The standards may be obtained from ANSI, 11 West $42^{nd}$ St., New York, N.Y. 10036 or http://www.ansi.org. The FC standard defines a layered protocol architecture consisting of five layers, the highest defining mappings from other communication protocols onto the FC fabric. FC can serve as the physical transport for other command protocols, including the SCSI command protocol and Internet Protocol ("IP").

While interfaces such as those defined by the IDE/ATA protocol, the FC protocol, and the SCSI protocol are used widely, these protocols do not provide a means for interfacing with the other. In general, IDE/ATA compliant devices are less expensive than FC and SCSI compliant devices; however, IDE/ATA compliant devices have typically not been suitable for high-end computer systems because of protocol and distance limitations. Thus, the more expensive FC compliant devices have typically been employed within high-end computer systems.

SUMMARY

In accordance with embodiments of the present invention, an interface adapter is provided that allows a host device that communicates through a first interface protocol, such as a Fibre Channel compliant interface or a SCSI compliant interface, to connect to a plurality of storage devices that communicate through a second interface protocol, such as an IDE/ATA compliant interface. The interface adapter is configured to convert transmissions received from the host device to the second interface protocol and to convey the converted transmissions to the plurality of storage devices. The interface adapter is also configured to convert transmissions received according to the second interface protocol from the plurality of storage devices to the first interface protocol and to convey the converted transmissions to the host device. In this manner, the host device and the storage devices can accomplish input/output (I/O) transactions despite the fact that they implement different interface protocols. The interface adapter may allow IDE/ATA storage devices to be used in storage systems connected to host computer systems that communicate through a Fibre Channel compliant interface.

In accordance with other embodiments of the present invention, a storage system is provided. The storage system comprises a host interface for receiving input/output ("I/O") transactions from a host device, said I/O transactions complying with a first interface protocol; a storage device interface for transmitting I/O transactions to a plurality of storage devices according to a second interface protocol; and an interface adapter coupled to the host interface and the storage device interface. The interface adapter is configured to receive I/O transactions from the host interface, to convert the I/O transactions from the first interface protocol to the second interface protocol, and to transmit the converted I/O transactions to the storage device interface, and said interface adapter is further configured to receive I/O transactions from the storage device interface, to convert the I/O transactions from the storage device interface from the second interface protocol to the first interface protocol, and to transmit the converted I/O transactions to the host interface.

In accordance with other embodiments of the present invention, a method of operating a storage system is provided. The method comprises receiving I/O transactions from a host device, said I/O transactions complying with a first interface protocol, said first interface protocol being a SCSI interface protocol or a Fibre Channel interface protocol; converting the I/O transactions from the first interface protocol to a second interface protocol; and transmitting the I/O transactions to a storage device having an interface complying with the second interface protocol, said second interface protocol being an IDE/ATA interface protocol.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

In the following description, reference is made to the accompanying drawings which forma part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, or combinations of the two.

Figure 1:
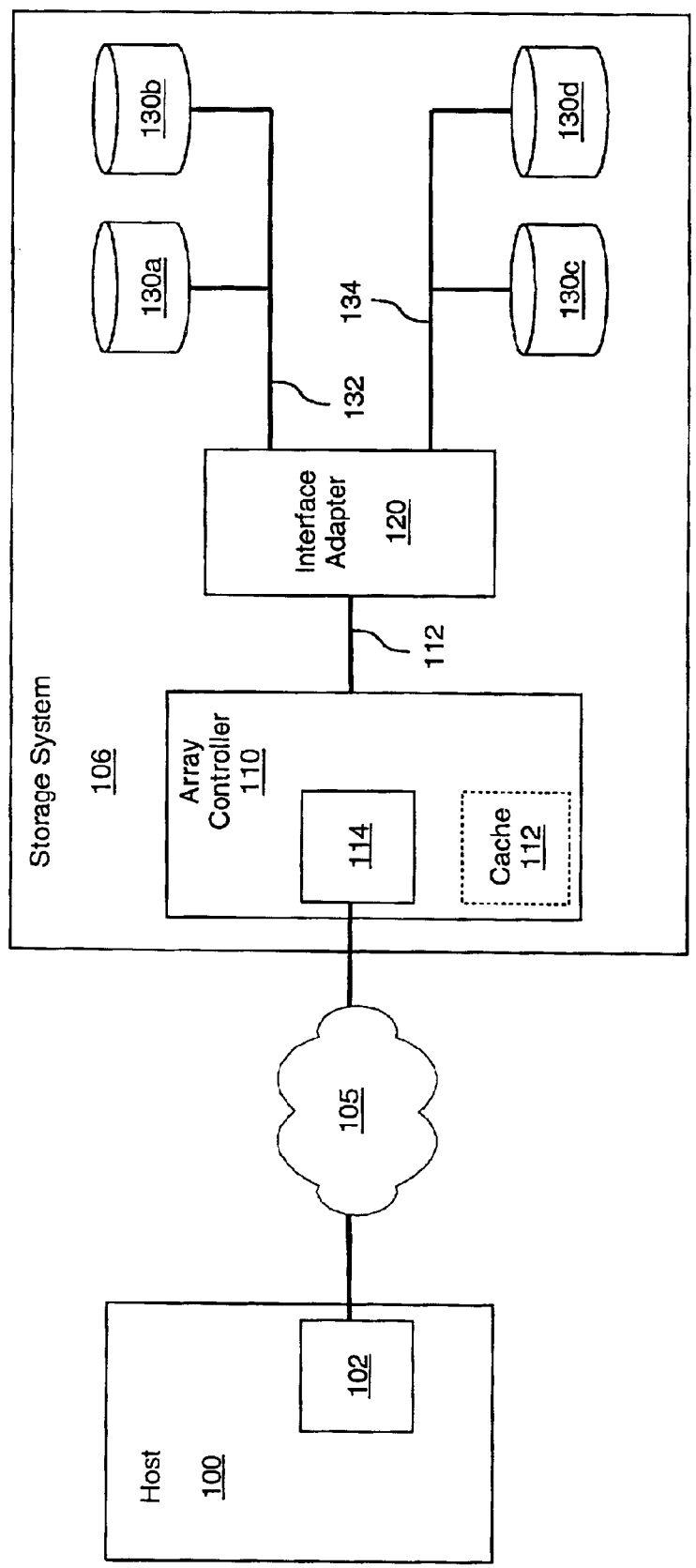
FIG. 1 is a block diagram illustrating one embodiment of an interface adapter in a storage system.

Turning now to FIG. 1, a block diagram illustrating one embodiment of an interface adapter in a storage system is shown. Other embodiments are possible and contemplated. FIG. 1 depicts host device 100 and storage system 106, which includes an array controller 110, an interface adapter 120, and storage devices 130a–130d. Host device 100 can include a host adapter 102 for transmitting communications to a host interface 114 provided in array controller 110 on storage system 106. Host adapter 102 can transmit I/O transactions to host interface 114 in storage system 106 over connection 105 using a communication protocol such as, for example, FC or SCSI. In other embodiments, the communication protocol used over connection 105 can comprise other types of protocols. In certain embodiments, array controller 110 may be integrated onto host device 100. Array controller 110 can optionally include cache 112 as indicated by the dotted lines. Array controller 110 is coupled to interface adapter 120 via connection 112. Interface adapter 120 is coupled to storage devices 130a and 130b via first bus 132 and storage devices 130c and 130d via second bus 134.

In one embodiment, storage devices 130a–130d are IDE/ATA compliant hard disk drives, and storage system 106 is a disk drive array. It is understood that the number of storage devices 130 in storage system 106 may vary and is not limiting. Although in FIG. 1 interface adapter 120 is shown separate from storage devices 130a–130d, an interface adapter 120 may be included in each of storage devices 130a–130d in other embodiments.

In the embodiment of FIG. 1, interface adapter 120 can permit host device 100 and array controller 110 to communicate with storage devices 130a–130d by converting transmissions in a protocol employed by host device 100 and/or array controller 110 to a different protocol employed by storage devices 130a–130d. Thus, host device 100 and array controller 110 can accomplish input/output (I/O) transactions with storage devices 130a–130d. In one embodiment, array controller 110 can be coupled to interface adapter 120 using a first interface protocol, and interface adapter 120 can be coupled to storage devices 130a–130d using a second interface protocol. In this embodiment, interface adapter 120 can be configured to receive transmissions from host device 100 and/or array controller 110 using the first interface protocol, convert those transmissions, and convey the converted transmissions to the appropriate storage devices 130a–130d using the second interface protocol. Similarly, interface adapter 120 can be configured to receive transmissions from storage device 130a–130d using the second interface protocol, convert those transmissions, and convey the converted transmissions to array controller 110 and host device 100. In this manner, storage system 106 can emulate a storage system which uses the first interface protocol, while utilizing storage devices 130a–130d complying with a second interface protocol.

In one embodiment, host adapter 102 is a Fibre Channel host bus adapter, which enables host device 100 to communicate with array controller 10 using the FC protocol. Storage devices 130a–130d are hard disk drives configured to implement the IDE/ATA protocol. Interface adapter 120 is configured to receive FC communications from array controller 110, convert them into IDE/ATA-compliant communications, and transmit those communications to one or more of storage devices 130a–130d. Similarly, interface adapter 120 is also configured to take IDE/ATA-compliant communications from storage devices 130a–130d and convert them into FC-compliant communications which can be received by array controller 110 and passed on to host device 100. In other embodiments, host adapter 102 is a SCSI host adapter, and interface adapter 120 converts SCSI communications into IDE/ATA communications and vice versa.

Array controller 110 can include a FC Logical Device Emulation hardware/software functional layer. Array controller 110 may also include hardware and software in support of RAID (redundant array of inexpensive drives)

function and management, logical device and virtual device mappings, reliability and environmental monitoring, remote and local data replication, and other intelligent functions as appropriate.

Host device 100 and/or array controller 110 can be configured to generate a plurality of frames that correspond to an I/O transaction. Host device 100 and/or array controller 110 can be configured to convey the frames to interface adapter 120. Interface adapter 120 can be configured to convert frames received from host device 100 and/or array controller 110 to a plurality of register inputs and a command input that can be conveyed to one or more of storage devices 130a–130d. The register inputs may each include register data and a register identifier. Similarly, the command input may include command data and a command register identifier. In response to receiving a plurality of register inputs and a command input, one of storage devices 130a–130d can be configured to execute an operation and generate one or more register outputs. Interface adapter 120 can be configured to read these register outputs from the one of storage devices 130a–130d and can convert the register outputs into a plurality of frames that can be conveyed to host device 100 and/or array controller 110.

In one embodiment, host device 100 can comprise a server computer. In other embodiments, host device 100 can comprise other devices such as a workstation, a backup storage, an enterprise storage, a hub, or a switch.

In one embodiment, storage devices 130a–130d can comprise any combination of hard disk drives, CD-ROM drives, magnetic tape drives, optical drives, solid state storage, or other storage devices configured to conform to an interface protocol. In other embodiments, storage devices 130a–130d can comprise other types or numbers of devices.

Figure 2:
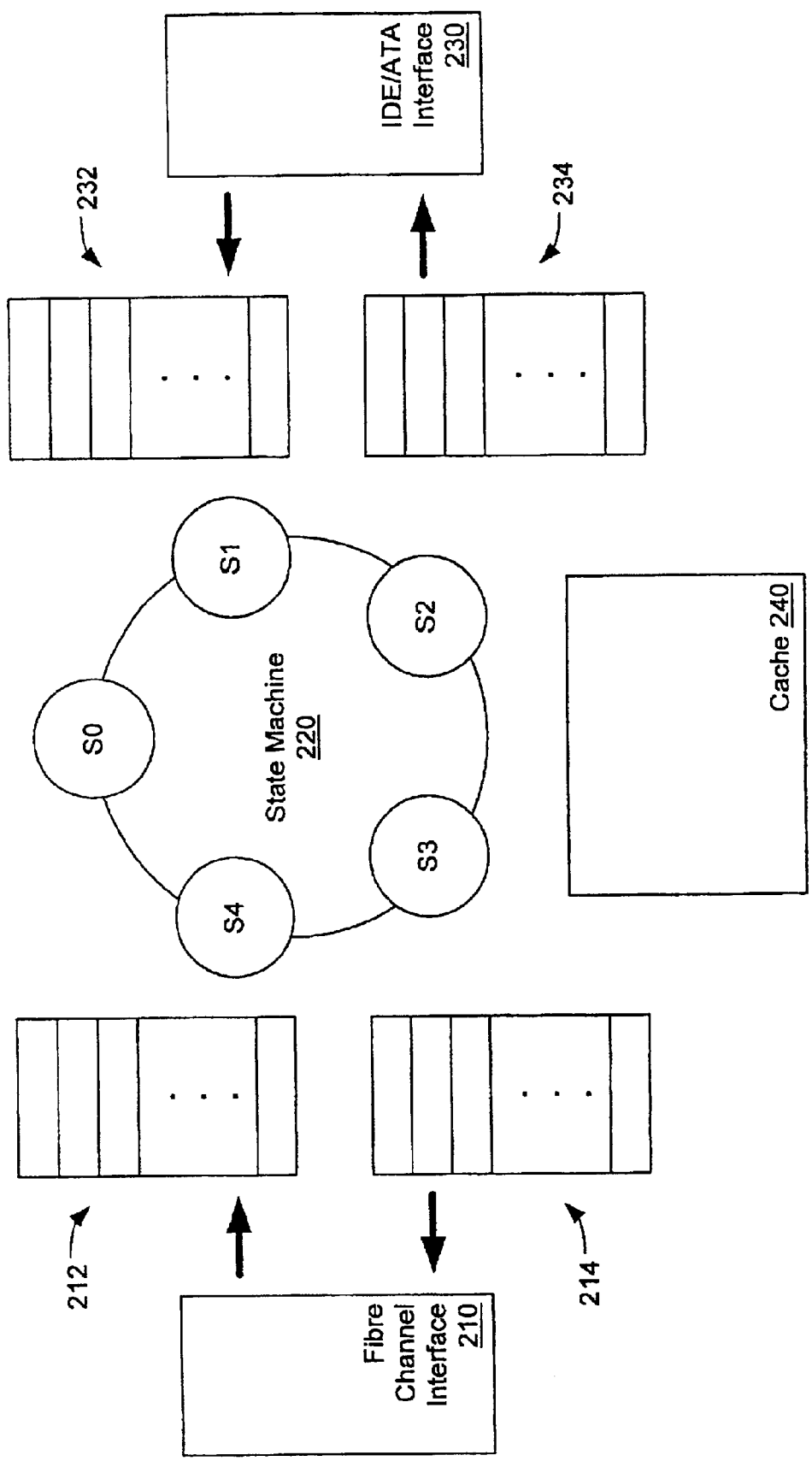
FIG. 2 is a block diagram illustrating one embodiment of an interface adapter.

Turning now to FIG. 2, a block diagram illustrating one embodiment of an interface adapter is shown. Other embodiments are possible and contemplated. FIG. 2 depicts FC interface 210, receive buffer 212, transmit buffer 214, state machine 220, cache 240, receive buffer 232, transmit buffer 234, and IDE/ATA interface 230. The embodiment shown in FIG. 2 can be included in interface adapter 120 of FIG. 1. Alternatively, the embodiment of FIG. 2 can be included in each of storage devices 130a–130d in FIG. 1.

FIG. 2 illustrates an embodiment of an interface adapter configured to convert transmissions between a FC protocol and an IDE/ATA protocol. In FIG. 2, receive buffer 212 and receive buffer 232 can be configured to buffer transmissions received from FC interface 210 and IDE/ATA interface 230, respectively. Similarly, transmit buffer 214 and transmit buffer 234 can be configured to buffer information to be transmitted using FC interface 210 and IDE/ATA interface 230, respectively. In one embodiment, receive buffer 212, receive buffer 232, transmit buffer 214, and transmit buffer 234 can comprise any suitable data storage mechanism. In other embodiments, one or more of receive buffer 212, receive buffer 232, transmit buffer 214, and/or transmit buffer 234 may be omitted.

In FIG. 2, state machine 220 can comprise a hardware and/or software emulation layer configured to allow one or more IDE/ATA devices to emulate FC devices. State machine 220 can be configured to convert a transmission received from FC interface 210 to a format that can be conveyed over IDE/ATA interface 230. Likewise, state machine 220 can be configured to convert a transmission received from IDE/ATA interface 230 to a format that can be conveyed over FC interface 210. In a first embodiment, state machine 220 can comprise a block of combinatorial logic configured to operate as a hardware emulation layer between FC interface 210 and IDE/ATA interface 230. In a second embodiment, state machine 220 can comprise one or more software routines configured to operate as a software emulation layer between FC interface 210 and IDE/ATA interface 230. In other embodiments, state machine 220 can comprise a combination of hardware and software to create an emulation layer.

Cache 240 can be configured to store transmissions received from FC interface 210 and IDE/ATA interface 230. In one embodiment, state machine 220 can be configured to determine whether cache 240 is storing data corresponding to a given transmission received from FC interface 210 or IDE/ATA interface 230. If cache 240 is storing data corresponding to the transmission, then state machine 220 can be configured to generate a response to the transmission using data stored in cache 240. In this manner, cache 240 may allow state machine 220 to generate an expedited response to a transmission received from FC interface 210 or IDE/ATA interface 230. Cache 240 can comprise any suitable storage device such as DRAM, SRAM, or SDRAM. Cache 240 can be included on an integrated circuit with state machine 220 or can be located externally from an integrated circuit that includes state machine 220. In one embodiment, cache 240 can be configured to store data corresponding to a transmission in a format of the transmission. In other embodiments, cache 240 can be configured to store data and/or transmissions in other manners.

In other embodiments, host 100 may communicate with storage system 106 using other communication protocols, such as, for example, the SCSI interface. In these embodiments, interface adapter 120 can be configured to convert the SCSI commands from host 100 into ATA/IDE commands, and transmit those commands to IDE storage devices 130.

Figure 3:
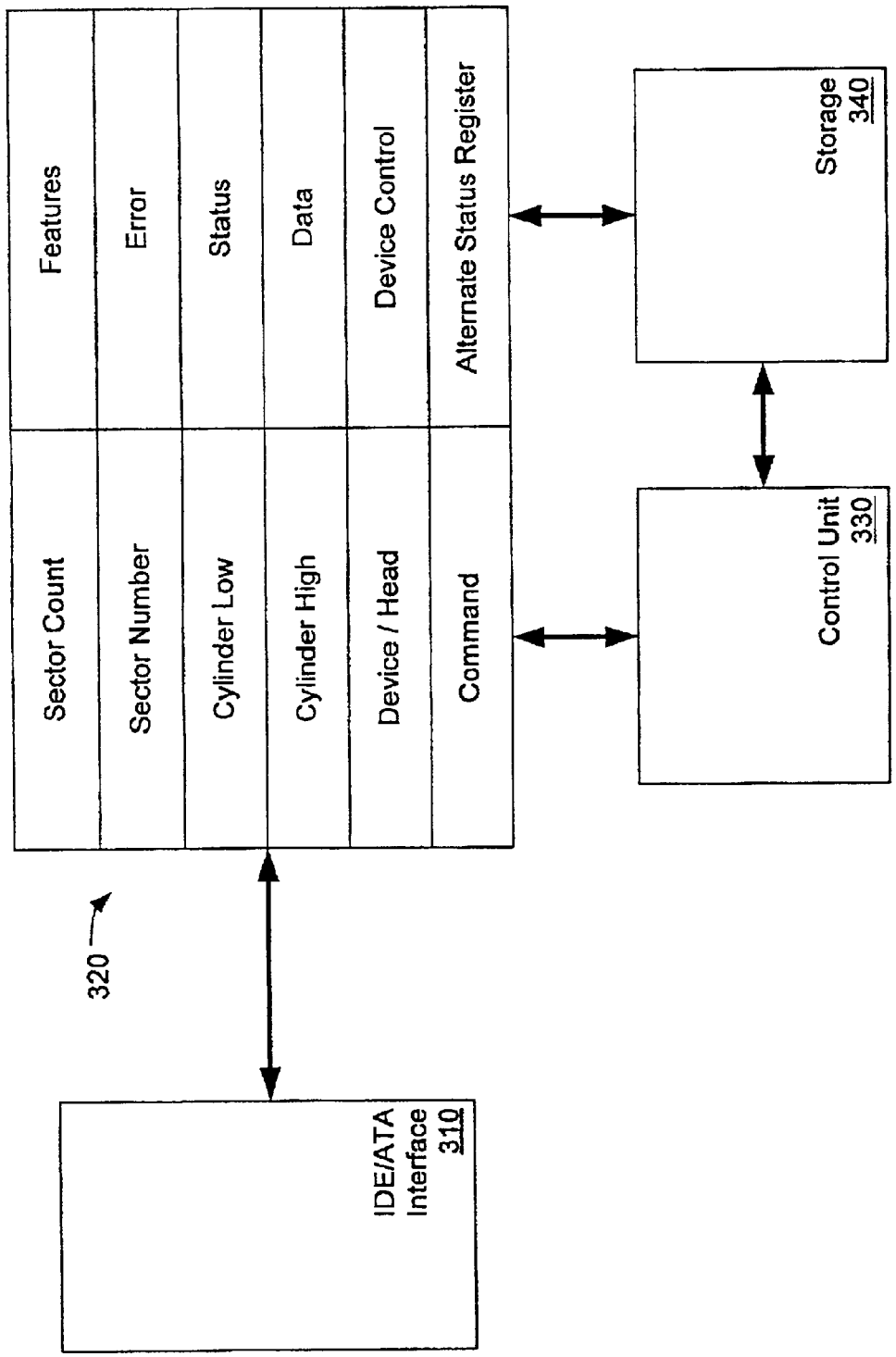
FIG. 3 is a block diagram illustrating one embodiment of a device that includes a bus interface.

Turning now to FIG. 3, a block diagram illustrating one embodiment of a device that includes a bus interface is shown. Other embodiments are possible and contemplated. FIG. 3 depicts IDE/ATA interface 310, a set of registers 320, a control unit 330, and storage 340. As indicated, registers 320 include a sector count register, a sector number register, a cylinder low register, a cylinder high register, a device/head register, a command register, a features register, an error register, a status register, a data register, a device control register, and an alternate status register. Other registers can be included as specified by a bus interface protocol. IDE/ATA interface 310 is coupled to registers 320. Control unit 330 is coupled to registers 320 and storage 340. Storage 340 is coupled to registers 320. Storage 340 can comprise any suitable storage for the device such as a magnetic medium used by a hard disk drive or a CD-ROM used by a CD-ROM drive.

FIG. 3 illustrates a device that includes a bus interface for communicating with storage devices such as storage devices 130a–130d shown in FIG. 1. In FIG. 3, the bus interface is configured to conform to the IDE/ATA protocol. In other embodiments, the bus interface can be configured to conform to other bus protocols.

In the embodiment of FIG. 3, IDE/ATA I/O transactions can be received over IDE/ATA interface 310 and stored in registers 320. IDE/ATA interface 310 can include a plurality of control lines, a plurality of data lines and a plurality of address lines. Registers 320 can be indexed by one or more signals conveyed on the address lines. Data can be read from or written to registers 320 according to values transmitted on the control and address lines.

In order to perform an I/O transaction with the device of FIG. 3, an external device can load values into one or more of registers 320 and then load a command value into the command register. In addition, an external device can be configured to read one or more of registers 320. Control unit 330 can be configured to detect that a command value has been loaded into the command register and can cause a command corresponding to the command value to be executed. Control unit 330 can be configured to cause the command to execute using one or more of the values loaded into registers 320. Certain commands may cause one or more of the values in registers 320 to be stored in storage 340. Similarly, certain commands may cause data stored in storage 340 to be loaded into one or more of registers 320.

Figure 4:
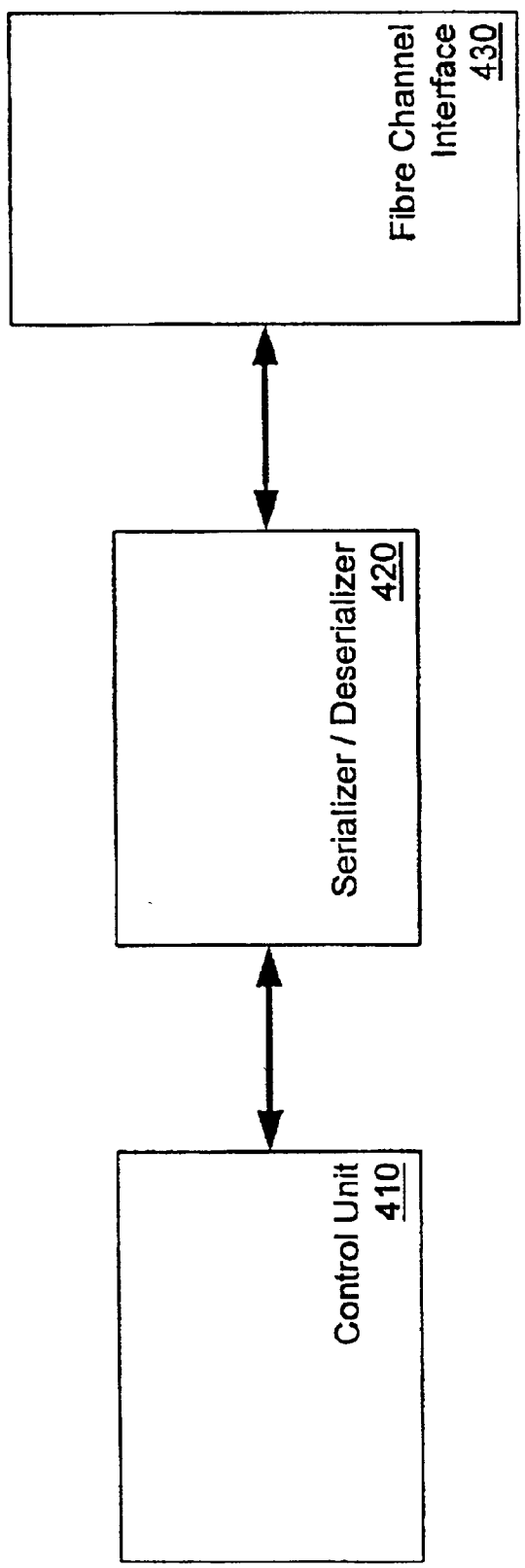
FIG. 4 is a block diagram illustrating one embodiment of a device that includes a bus interface

Turning now to FIG. 4, a block diagram illustrating one embodiment of a device that includes a bus interface is shown. Other embodiments are possible and contemplated. FIG. 4 depicts control unit 410, serializer/deserializer 420, and FC interface 430. Control unit 410 is coupled to serializer/deserializer 420, and serializer/deserializer 420 is coupled to FC interface 430.

FIG. 4 illustrates a device that includes a bus interface to be used in, for example, array controller 110 or host device 100 shown in FIG. 1. In FIG. 4, the bus interface can be configured to conform to the FC protocol. In other embodiments, the bus interface can be configured to conform to other bus protocols.

In the embodiment of FIG. 4, FC I/O transactions can be received and transmitted over FC interface 430. These I/O transactions can be conveyed over a connection 105 in a FC-compliant serial format. Serializer/deserializer 420 can be configured to serialize the I/O transactions that are to be conveyed on over connection 105. In addition, serializer/deserializer 420 can be configured to deserialize I/O transactions that are received from storage system 106 over connection 105. I/O transactions can be deserialized into a format called frames. Control unit 410 can be configured to receive the frames from serializer/deserializer 420 and can be configured to process the frames. Similarly, control unit 410 can be configured to convey frames to serializer/deserializer 420 to be serialized before being conveyed across FC interface 430.

In order to perform an I/O transaction, control unit 410 can be configured to generate and convey a sequence of frames that correspond to the I/O transaction. Control unit 410 can convey the sequence to serializer/deserializer 420 which can convey the sequence over FC interface 430 in a serial format. A device that receives the sequence can generate a response sequence of frames in response to processing the initial sequence. The device can convey the response sequence, which can be received over FC interface 430, deserialized by serializer/deserializer 420, and processed by control unit 410. It can be noted that a series of sequences transmitted between two devices can be referred to as an exchange.

Figure 5:
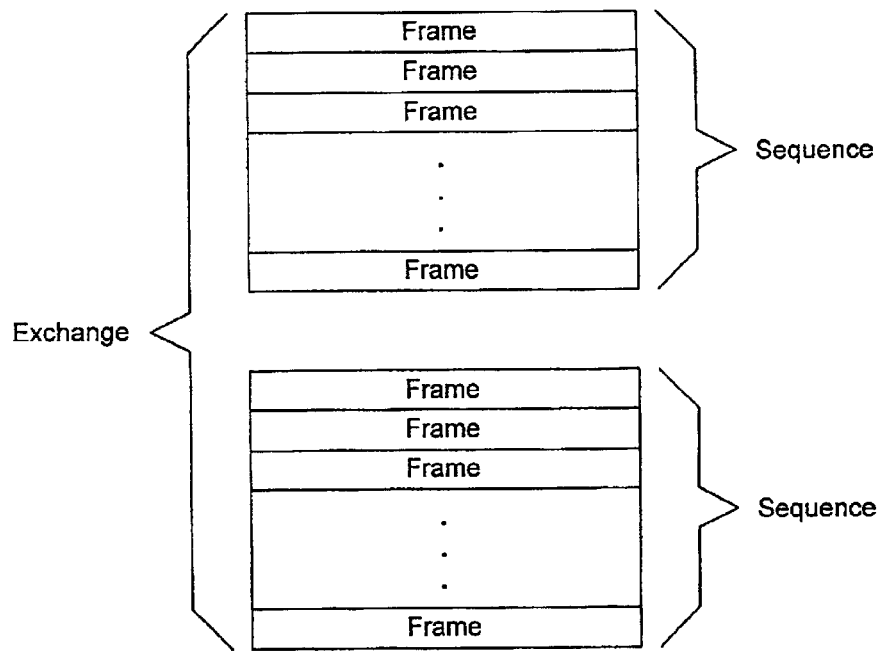
FIG. 5 is a block diagram illustrating one embodiment of a transmission format for a bus protocol.

Turning now to FIG. 5, a block diagram illustrating one embodiment of a transmission format for a bus protocol is shown. Other embodiments are possible and contemplated. As discussed above, a plurality of frames corresponding to an I/O transaction can be generated and conveyed over connection 105. This plurality of frames comprises a sequence. A device that receives the sequence can generate a plurality of frames in response. This response plurality of frames also comprises a sequence. The series of sequences, in turn, comprises an exchange between two devices. An exchange between two devices may include multiple sequences by each device in order to accomplish an I/O transaction.

Figure 6:
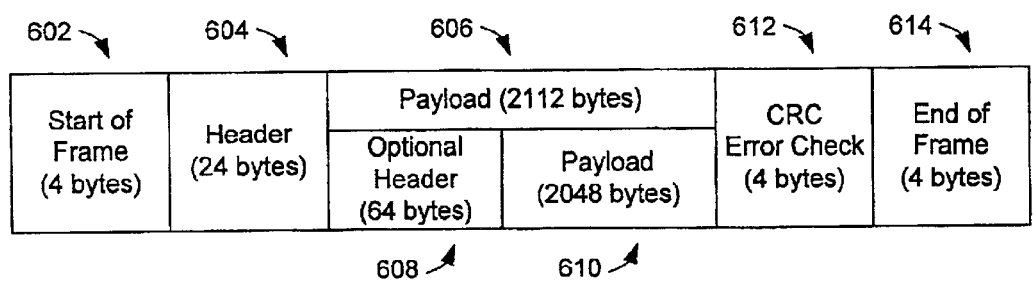
FIG. 6 is a block diagram illustrating one embodiment of a transmission format for a bus protocol.

Turning now to FIG. 6, a block diagram illustrating one embodiment of a transmission format for a bus protocol is shown. Other embodiments are possible and contemplated. FIG. 6 depicts one embodiment of a format for a frame described above in FIG. 4 and FIG. 5. As indicated in FIG. 6, a frame can comprise a start of frame 602, a header 604, a payload 606, a CRC (cyclical redundancy check) error check 612, and an end of frame 614. As indicated, a frame may include an optional header 608 and a payload 610 in place of payload 606. In the embodiment shown in FIG. 6, start of frame 602 includes four bytes, header 604 includes twenty-four bytes, payload 606 includes 2112 bytes, CRC error check 612 includes four bytes, and end of frame 614 includes four bytes. In addition, optional header 608 includes sixty-four bytes and payload 610 includes 2048 bytes. Other byte sizes can be used in other frame formats.

Figure 7:
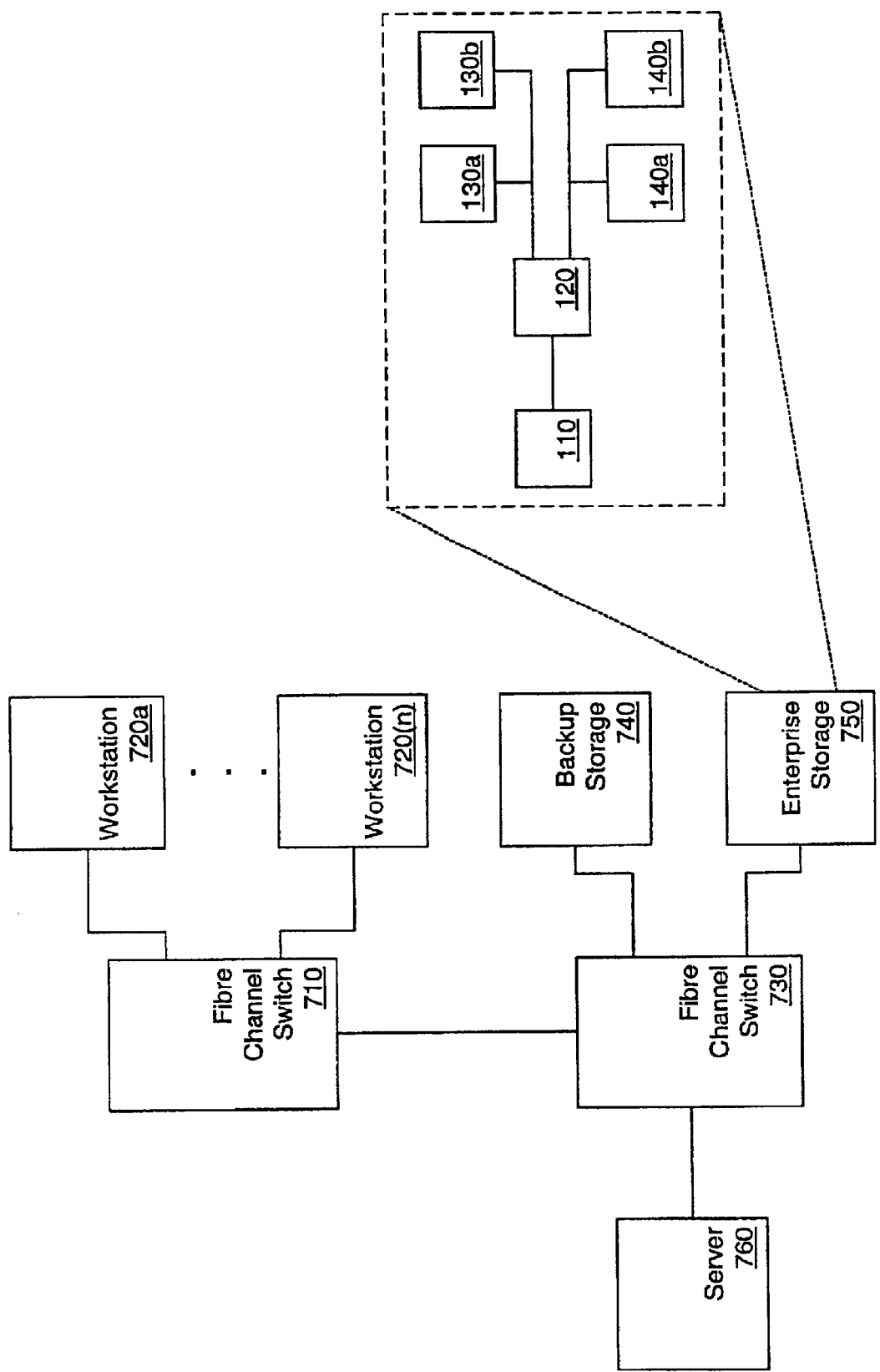
FIG. 7 is a block diagram illustrating one embodiment of a storage system configured to include the interface adapter of FIG. 1.

Turning now to FIG. 7, a block diagram illustrating one embodiment of a system configured to include the interface adapter of FIG. 1 is shown. Other embodiments are possible and contemplated. FIG. 7 depicts FC switch 710, workstations 720a through 720(n) (where 'n' can indicate the n'th integer number of workstations), FC switch 730, backup storage 740, enterprise storage 750, and server 760. FC switch 710 is coupled to workstations 720a through 720(n) and FC switch 730. FC switch 730 is coupled to backup storage 740, enterprise storage 750, and server 760. As indicated in FIG. 7, enterprise storage 750 can include array controller 110, interface adapter 120, and storage devices 130a–130d from FIG. 1. In other embodiments, elements from FIG. 1 can be included in other devices.

In the embodiment of FIG. 7, workstations 720a through 720(n) can communicate with storage devices 130a–130d using FC switch 710 and FC switch 730. Server 760 and backup storage 740 can communicate with storage devices 130a–130d using FC switch 730. In one embodiment, storage devices 130a–130d can comprise IDE/ATA disk drives configured in a RAID storage. In one embodiment, the connections between each device and FC switches 710 and 730 can comprise FC connections.

Figure 8:
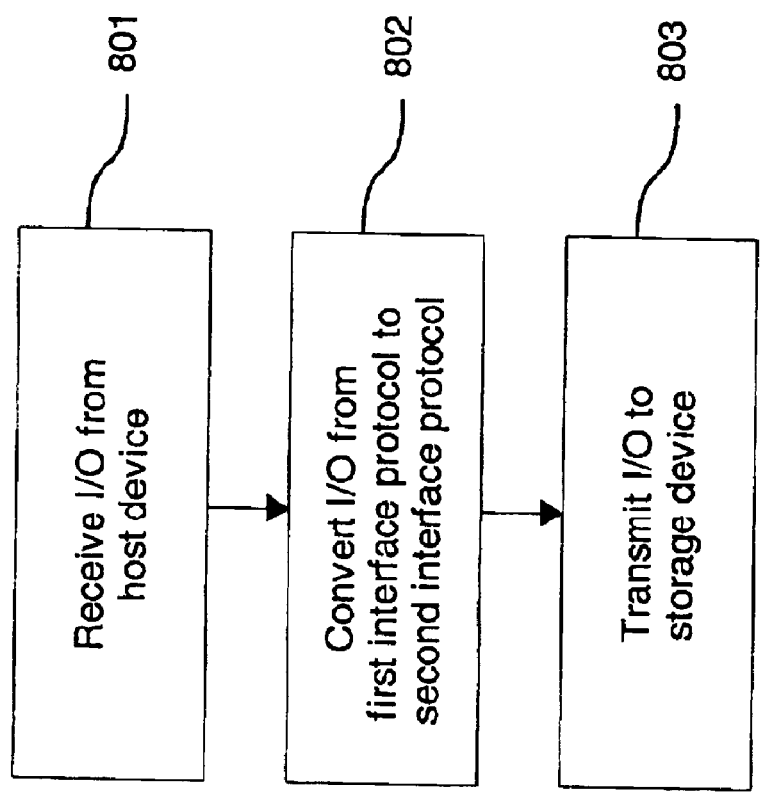
FIG. 8 is a flowchart of a method of operating a storage system in accordance with an embodiment of the present invention.

FIG. 8 is a flowchart of a method of operating a storage system in accordance with various embodiments of the present invention. In step 801, I/O transactions are received from a host device. These I/O transactions comply with a first interface protocol, such as FC or SCSI. In step 802, these I/O transactions are converted from the first interface protocol to a second interface protocol. Then, in step 803, these converted I/O transactions are transmitted to a storage device having an interface complying with the second interface protocol. Various embodiments of this method can enable a host server configured to communicate using a high-performance interface protocol, such as FC or SCSI, to be used with a storage system incorporating an array of inexpensive IDE/ATA disk drives. The storage system can emulate a FC or SCSI storage system, while communicating with its disk drives using the IDE/ATA interface.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

I claim:

1. A storage system, comprising:
   a host interface for receiving input/output ("I/O") transactions from a host device, said I/O transactions complying with a first interface protocol;

a storage device interface for transmitting I/O transactions to a plurality of storage devices according to a second interface protocol; and an interface adapter coupled to the host interface and the storage device interface, wherein said interface adapter is configured to receive I/O transactions from the host interface, to convert the I/O transactions from the first interface protocol to the second interface protocol, and to transmit the converted I/O transactions to the storage device interface, and said interface adapter is further configured to receive I/O transactions from the storage device interface, to convert the I/O transactions from the storage device interface from the second interface protocol to the first interface protocol, and to transmit the converted I/O transactions to the host interface, and wherein the interface adapter further includes a state machine comprising a software emulation layer, wherein the software emulation layer comprises one or more software routines configured to operate as an emulation layer between the host interface and the storage device interface.

2. The storage system of claim 1, wherein:
the second interface protocol is an IDE/ATA interface protocol.

3. The storage system of claim 1, wherein:
the first interface protocol is a SCSI interface protocol.

4. The storage system of claim 1, wherein:
the first interface protocol is a Fibre Channel interface protocol.

5. The storage system of claim 1, wherein:
said interface adapter is configured to receive a first plurality of frames corresponding to an I/O transaction generated by the host device, wherein said interface adapter is configured to convert said first plurality of frames into a plurality of register inputs and a command input corresponding to said I/O transaction, wherein said interface adapter is configured to cause said plurality of register inputs to be
loaded into a plurality of registers on one of said plurality of storage devices, and wherein said interface adapter is configured to cause said command input to be loaded into a command register on said one of said plurality of storage devices.

6. The storage system of claim 5, wherein said first plurality of frames arrive at said interface adapter in a serial format, and wherein said interface adapter is configured to deserialize said first plurality of frames.

7. The storage system of claim 5, wherein:
said interface adapter includes a first receive buffer and a first transmit buffer coupled to the host interface, and said interface adapter further includes a second receive buffer and a second transmit buffer coupled to the storage device interface, wherein said first plurality of frames is received in said first receive buffer, and wherein said plurality of register inputs is received in said second transmit buffer prior to being loaded into said plurality of registers.

8. The storage system of claim 5, wherein:
said interface adapter is configured to receive a plurality of register outputs from the storage device interface, convert said plurality of register outputs to a second plurality of frames, and convey said second plurality of frames to said host interface.

9. The storage system of claim 1, wherein:
the state machine is configured to receive a plurality of frames corresponding to an I/O transaction from said host interface, wherein said state machine is configured to convert said plurality of frames into a plurality of register inputs and a command input corresponding to said I/O transaction, wherein said state machine is configured to cause said plurality of register inputs to be loaded into a plurality of registers on one of the plurality of storage devices, and wherein said state machine is configured to cause said command input to be loaded into a command register on said one of the plurality of storage devices.

10. The storage system of claim 9, wherein said plurality of frames arrive at said state machine in a serial format, and wherein said state machine is configured to deserialize said plurality of frames.

11. The storage system of claim 9, further comprising:
a first receive buffer coupled to said host interface; a first transmit buffer coupled to said host interface;
a second receive buffer coupled to said storage device interface; and a second transmit buffer coupled to said storage device interface;
wherein said plurality of frames is received in said first receive buffer, and said plurality of register inputs is received in said second transmit buffer prior to being loaded into said plurality of registers.

12. A method of operating a storage system, comprising:
receiving I/O transactions from a host device, said I/O transactions complying with a first interface protocol, said first interface protocol being a SCSI interface protocol or a Fibre Channel interface protocol;
converting the I/O transactions from the first interface protocol to a second interface protocol, wherein said converting is performed in a state machine comprising a software emulation layer configured to operate as an emulation layer between the host interface and the storage device interface; and
transmitting the I/O transactions to a storage device having an interface complying with the second interface protocol, said second interface protocol being an IDE/ATA interface protocol.

13. The method of claim 12, wherein:
said receiving I/O transactions from the host device comprises receiving a first plurality
of frames corresponding to an I/O transaction generated by the host device; said converting the I/O transactions from the first interface protocol to the second interface protocol comprises converting said first plurality of frames into a
plurality of register inputs and a command input corresponding to said I/O transaction; and
said transmitting the I/O transactions to the storage device comprises:
loading said plurality of register inputs into a plurality of registers on the storage device; and
loading said command input into a command register on one of said plurality of storage devices.

14. The method of claim 13, wherein:
said receiving the first plurality of frames comprises receiving the first-plurality of frames in a serial format, and
said converting the I/O transactions from the first interface protocol to the second interface protocol comprises deserializing said first plurality of frames.

15. The method of claim 13, further comprising:
in response to the command input being loaded into the command register of the storage device, executing an operation on the storage device corresponding to said I/O transaction.

16. A storage system, comprising:
a host interface for receiving input/output ("I/O") transactions from a host device, said I/O transactions complying with a first interface protocol;
a plurality of storage devices configured to receive I/O transactions according to a second interface protocol; and
an interface adapter coupled to the host interface and the plurality of storage devices, wherein said interface adapter is configured to receive I/O transactions from the host interface, to convert the I/O transactions from the first interface protocol to the second interface protocol, and to transmit the converted I/O transactions to one of the plurality of storage devices, and said interface adapter is further configured to receive I/O transactions from the plurality of storage devices, to convert the I/O transactions from the plurality of storage devices from the second interface protocol to the first interface protocol, and to transmit the converted I/O transactions to the host interface, and wherein the interface adapter further includes a state machine comprising a software emulation layer, wherein the software emulation layer comprises one or more software routines configured to operate as an emulation layer between the host interface and each of the plurality of storage devices.

17. The storage system of claim 16, wherein:
the second interface protocol is an IDE/ATA interface protocol.

18. The storage system of claim 16, wherein:
the first interface protocol is a SCSI interface protocol.

19. The storage system of claim 16, wherein:
the first interface protocol is a Fibre Channel interface protocol.

20. The storage system of claim 16, wherein:
each of said plurality of storage devices includes a plurality of registers and a command register; and
said interface adapter is configured to receive a first plurality of frames corresponding to an I/O transaction generated by the host device, wherein said interface adapter is configured to convert said first plurality of frames into a plurality of register inputs and a command input corresponding to said I/O transaction, wherein said interface adapter is configured to cause said plurality of register inputs to be loaded into the plurality of registers on one of said plurality of storage devices, and wherein said interface adapter is configured to cause said command input to be loaded into the command register on said one of said plurality of storage devices.

21. The storage system of claim 20, wherein said first plurality of frames arrive at said interface adapter in a serial format, and wherein said interface adapter is configured to deserialize said first plurality of frames.

22. The storage system of claim 20, wherein each of said plurality of storage devices is configured to execute an operation corresponding to said I/O transaction in response to said command input being loaded into said command register of said one of said plurality of storage devices.

23. The storage system of claim 20, further comprising:
a storage device interface provided in the interface adapter for communicating with the plurality of storage devices;
wherein said interface adapter includes a first receive buffer and a first transmit buffer coupled to the host interface, and said interface adapter further includes a second receive buffer and a second transmit buffer coupled to the storage device interface, wherein said first plurality of frames is received in said first receive buffer, and wherein said plurality of register inputs is received in said second transmit buffer prior to being loaded into said plurality of registers.

24. The storage system of claim 20, wherein:
one of said plurality of storage devices is configured to generate a plurality of register outputs corresponding to said I/O transaction; and
said interface adapter is configured to receive said plurality of register outputs from said one of said plurality of storage devices, convert said plurality of register outputs to a second plurality of frames, and convey said second plurality of frames to said host interface.

25. The storage system of claim 16, wherein:
each of said plurality of storage devices includes a plurality of registers and a command register; and
wherein the state machine configured to receive a plurality of frames corresponding to an I/O transaction from said host interface, wherein said state machine is configured to convert said plurality of frames into a plurality of register inputs and a command input corresponding to said I/O transaction, wherein said state machine is configured to cause said plurality of register inputs to be loaded into the plurality of registers on one of the plurality of storage devices, and wherein said state machine is configured to cause said command input to be loaded into the command register on said one of the plurality of storage devices.

26. The storage system of claim 25, wherein said plurality of frames arrive at said state machine in a serial format, and wherein said state machine is configured to deserialize said plurality of frames.

27. The storage system of claim 25, further comprising:
a storage device interface provided between the interface adapter and the plurality of storage devices;
a first receive buffer coupled to said host interface;
a first transmit buffer coupled to said host interface;
a second receive buffer coupled to said storage device interface; and
a second transmit buffer coupled to said storage device interface;
wherein said plurality of frames is received in said first receive buffer, and said plurality of register inputs is received in said second transmit buffer prior to being loaded into said plurality of registers.

28. An apparatus comprising:
a host device coupled to a first connection device;
a plurality of bus devices coupled to a second connection device;
an interface adapter, wherein said interface adapter includes a first interface coupled to said first connection device and a second interface coupled to said second connection device;
wherein said interface adapter is configured to receive a first plurality of frames corresponding to an input/output (I/O) transaction generated by said host device, wherein interface adapter is configured to convert said first plurality of frames into a plurality of register inputs and a command input corresponding to said I/O transaction, wherein said interface adapter is configured to cause said plurality of register inputs to be loaded into a plurality of registers on each of said plurality of bus devices, and wherein said interface adapter is configured to cause said command input to be loaded into a command register on each of said plurality of bus devices, and wherein the interface adapter further includes a state machine comprising a software emulation layer, wherein the software emulation layer comprises one or more software routines configured to operate as an emulation layer between the host interface and each of the plurality of storage devices.

29. An apparatus comprising:

a first interface;

a second interface; and a state machine coupled to said first interface and said second interface, wherein the state machine comprising a software emulation having one or more software routines configured to operate as an emulation layer between the host interface and each of the plurality of storage devices;

wherein said state machine is configured to receive a plurality of frames corresponding to a input/output (I/O) transaction from said first interface, wherein said state machine is configured to convert said plurality of frames into a plurality of register inputs and a command input corresponding to said I/O transaction, wherein said state machine is configured to cause said plurality of register inputs to be loaded into a plurality of registers on a device coupled to said second interface, and wherein said state machine is configured to cause said command input to be loaded into a command register on said device.

30. A computer system comprising:

an array controller coupled to a first connection device;

at least one server computer coupled to said array controller;

a plurality of bus devices coupled to a second connection device; and an interface adapter coupled to said first connection device and said second connection device, wherein the interface adapter includes a state machine comprising a software emulation having one or more software routines configured to operate as an emulation layer between the host interface and each of the plurality of storage devices;

wherein said at least one server computer is configured to generate an input/output (I/O) transaction, wherein said array controller is configured to receive said I/O transaction and generate a first plurality of frames corresponding to said input/output (I/O) transaction, wherein said interface adapter is configured to receive said first plurality of frames, wherein interface adapter is configured to convert said first plurality of frames into a plurality of register inputs and a command input corresponding to said I/O transaction, wherein said interface adapter is configured to cause said plurality of register inputs to be loaded into a plurality of registers on each of said plurality of bus devices, and wherein said interface adapter is configured to cause said command input to be loaded into a command register on each of said plurality of bus devices.

* * * * *